(12) United States Patent
Chen

(10) Patent No.: US 6,980,484 B2
(45) Date of Patent: Dec. 27, 2005

(54) FISH FINDING DEVICE AND METHOD FOR DETECTING AND DISTINGUISHING MARINE LIFE FROM A SONAR REFLECTED MARKER

(76) Inventor: Hwang-Hsing Chen, 7649 Grassland Dr., Fort Worth, TX (US) 76133

( * ) Notice: Subject to any disclaimer, the term of this patent is extended or adjusted under 35 U.S.C. 154(b) by 100 days.

(21) Appl. No.: 10/965,489

(22) Filed: Oct. 14, 2004

(65) Prior Publication Data

US 2005/0169106 A1    Aug. 4, 2005

Related U.S. Application Data

(62) Division of application No. 10/767,532, filed on Jan. 30, 2004.

(51) Int. Cl.[7] .............................................. G01S 15/96
(52) U.S. Cl. ...................................................... 367/99
(58) Field of Search ............................. 367/99, 97, 95, 367/2, 111

(56) References Cited

U.S. PATENT DOCUMENTS

| | | | |
|---|---|---|---|
| 4,597,069 A * | 6/1986 | Milano et al. ................ 367/95 |
| 4,641,455 A * | 2/1987 | Johnson ..................... 43/42.13 |
| 4,888,904 A * | 12/1989 | Douglas, Jr. ................. 43/17.6 |
| 5,177,891 A * | 1/1993 | Holt ........................... 43/17.1 |
| 5,260,912 A * | 11/1993 | Latham ....................... 367/88 |
| 5,495,689 A * | 3/1996 | Cassem ....................... 367/107 |
| 5,546,362 A * | 8/1996 | Baumann et al. ............ 367/173 |
| 5,651,209 A * | 7/1997 | Rainey ....................... 43/173.5 |
| 6,628,569 B1 * | 9/2003 | Steiner et al. ............... 367/111 |
| 6,724,688 B2 * | 4/2004 | Betts et al. ................... 367/99 |
| 6,768,701 B1 * | 7/2004 | Cummings et al. .......... 367/109 |
| 6,771,562 B2 * | 8/2004 | Betts et al. ................... 367/111 |

FOREIGN PATENT DOCUMENTS

JP          405196732 A    *   8/1993    ................ 367/110

* cited by examiner

*Primary Examiner*—Daniel Pihulic

(57) ABSTRACT

An improved fish finding device and method for detecting and distinguishing marine life from a sonar reflected marker that generates artificial echoes comprises steps of 1. transmitting of sonar waves 2. receiving of sonar echoes 3. distinguishing the sonar echoes reflected from a sonar reflected marker from the marine life by the difference of frequency, intensity, waveform and duration of the echoes and converting echoes into signal using a microprocessor and 4. displaying the echoes signal of the sonar reflected marker as an icon different from that of the marine life. The relative distance of the sonar reflected marker and the marine life could also be calculated by a microprocessor. A fish nearby alarm sounds when fish swims within a preset value of distance. The improved fish finding device and the fish finding method guide the user to adjust accurately the bait next to fish. The improved fish finding device also alarms the user that fish is nearby the bait when a sonar reflected maker is used and placed next to the bait.

14 Claims, 5 Drawing Sheets

Sounds alarm when
ΔX, ΔY and ΔZ are all shorter than a pre-selected set of value.

In a 2D sonar fish finder ΔZ is 0.

$$\Delta D = \sqrt{\Delta X^2 + \Delta Y^2 + \Delta Z^2}$$

Sounds alarm when
ΔD calculated by the equation is shorter than a pre-selected value.

In a 2D sonar fish finder ΔZ is 0.

FISH FINDING DEVICE AND METHOD FOR DETECTING AND DISTINGUISHING MARINE LIFE FROM A SONAR REFLECTED MARKER

CROSS REFERENCE TO RELATED APPLICATIONS

This is a division of Ser. No. 10/767,532, filed on Jan. 30, 2004.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of sonar detector and more specifically to an improved fish finding device and method for detecting and distinguishing marine life from a sonar reflected marker.

Fish sonar detectors have been invented and used in fishing and the research of the underwater lives for a long time. Many new improvements on the fish detectors have been invented to increase its accuracy and portability. Global position system (GPS) has also been combined to many of new fish detectors. These new fish detectors greatly increase the safety and convenience of the fishing.

U.S. Pat. No. 6,771,562 and U.S. Pat. No. 6,724,688 disclosed a fish finding method and system that has a buoyant station with a sonar transmitter, a sonar receiver, a sonar to electric signal transducer and a radio transmitter all controlled by a microprocessor and the signal is transmitted to a shore station to display underwater fish. U.S. Pat. No. 6,768,701 disclosed a flasher-type fish finder with zoom feature that allows the user to select an area of interest within a body of water and then display representations of the objects located within that area of interest. U.S. Pat. No. 4,597,069 disclosed a depthsounder/fish finder that selectively measures ether bottom depth or the depth of any fish located beneath a vessel. U.S. Pat. No. 6,628,569 disclosed a fish finder device with integrated controller that facilitates the user to control the function of the fish finder.

All prior technology in fish finder focuses in the detection and display of the under water fish. Users of the fish finder can follow the information of the display and try to place the bait to location of the fish as closely as possible. However the success of fishing depends mainly on the experience of the user since there is no enough information to show the user if the bait has been placed to the right place.

U.S. patent application Ser. No. 10/767,532 filed on Jan. 28, 2004 disclosed a sounding device that can be attached to the fishing rod next to the bait. The sounding device reflects the sonar wave from the fish detector to show its location that is also the location of the bait. The sounding device has the function of a sonar reflected marker and can be used together with any fish finder and increase the success of fishing. Although the current fish finder can be used with the sounding device an advanced and improved fish finding device is really needed to make the best use of the sounding device to increase the success of fishing.

BRIEF SUMMARY OF THE INVENTION

The primary object of the invention is to provide a fish finder that detects and identifies fish and other sonar reflected object.

Another object of the invention is to provide a fish finder that distinguishes fish from other sonar reflected object.

Another object of the invention is to provide a fish finder that displays fish and other sonar reflected object as different icons that are easily distinguishable by users.

Another object of the invention is to provide a fish finder that measures the distance between fish and other sonar reflected object.

A further object of the invention is to provide a fish finder that produces alarm when fish is within the preset distance of the sonar reflected objects.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an improved fish finding method for detecting and distinguishing marine life from an sonar reflected marker comprising: step a) generating and transmitting a stream of sonar pulses of a pre-selected waveform, b) receiving the sonar echoes of said sonar reflected marker and said marine life, c) distinguishing said sonar echoes of said sonar reflected marker and said marine life by the difference of the echoes and converting said sonar echoes into different signals, and d) displaying echo signals of said sonar reflected marker and said marine life on a display means.

In accordance with a preferred embodiment of the invention, there is disclosed an improved fish finding device for detecting and distinguishing marine life from an sonar reflected marker comprising: 1) a sonar transmitter, 2) a sonar receiver, 3) a microprocessor to control said transmitter and said receiver and to convert the sonar echoes into signals and said microprocessor is capable of distinguishing sonar echoes of said marine life from said sonar reflected marker and converting said echoes into different signals, and 4) a display means to display said echo signals and said display means is capable of displaying said sonar reflected marker as a different icon that is different from said marine life.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner. The invention relates generally to the field of fish finding device and method and more specifically to a device and method for detecting and distinguishing the echoes of the marine life from a sonar reflected marker that is attached next to the bait of a fishing rod.

Figure 1:
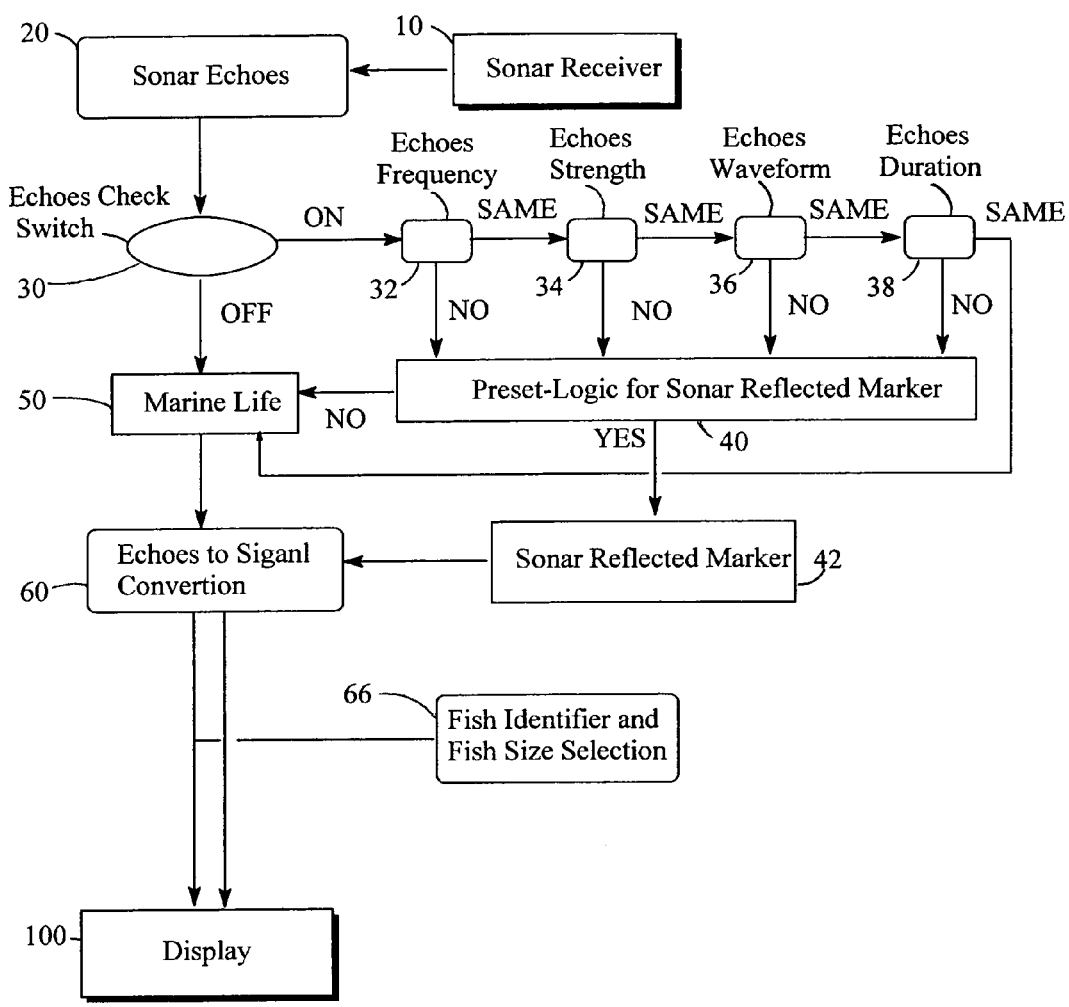
FIG. 1 is a schematic illustration of the operation process of the improved fish finder and the methods of detecting and distinguishing the sonar echoes.

With reference to FIG. 1, the present invention provides the methods of detecting and distinguishing the sonar echoes using a solar reflected marker that is attached next to the bait and the marker receives and reflects the sonar wave of the fish finding device to show its (also the bait's) location clearly on a fish finder. The sonar reflected marker is deigned to transmit a sonar echoes similar to fish but distinguishable by the fish finder. The sonar receiver 10 of the improved fish finder receives sonar echoes 20 that are processed by a microprocessor. Based on the difference of the frequency 32, the strength 34, the waveform 36 and the duration 38 and a preset logic for sonar reflected marker 40 the sonar echoes of fish and marine life 50 are converted 60 to signals and displayed at display 100. The echo of the sonar reflected marker 42 is converted to a different signal and displayed as a special icon on display 100. The fish echoes can be distinguished at the fish identifier and fish size selection 66 using a pre-selected logic. By controlling step 66 the echo signals of the small size fish and other marine life can be filtered and deleted and only the selected size of fish are shown in the display 100.

Figure 2:
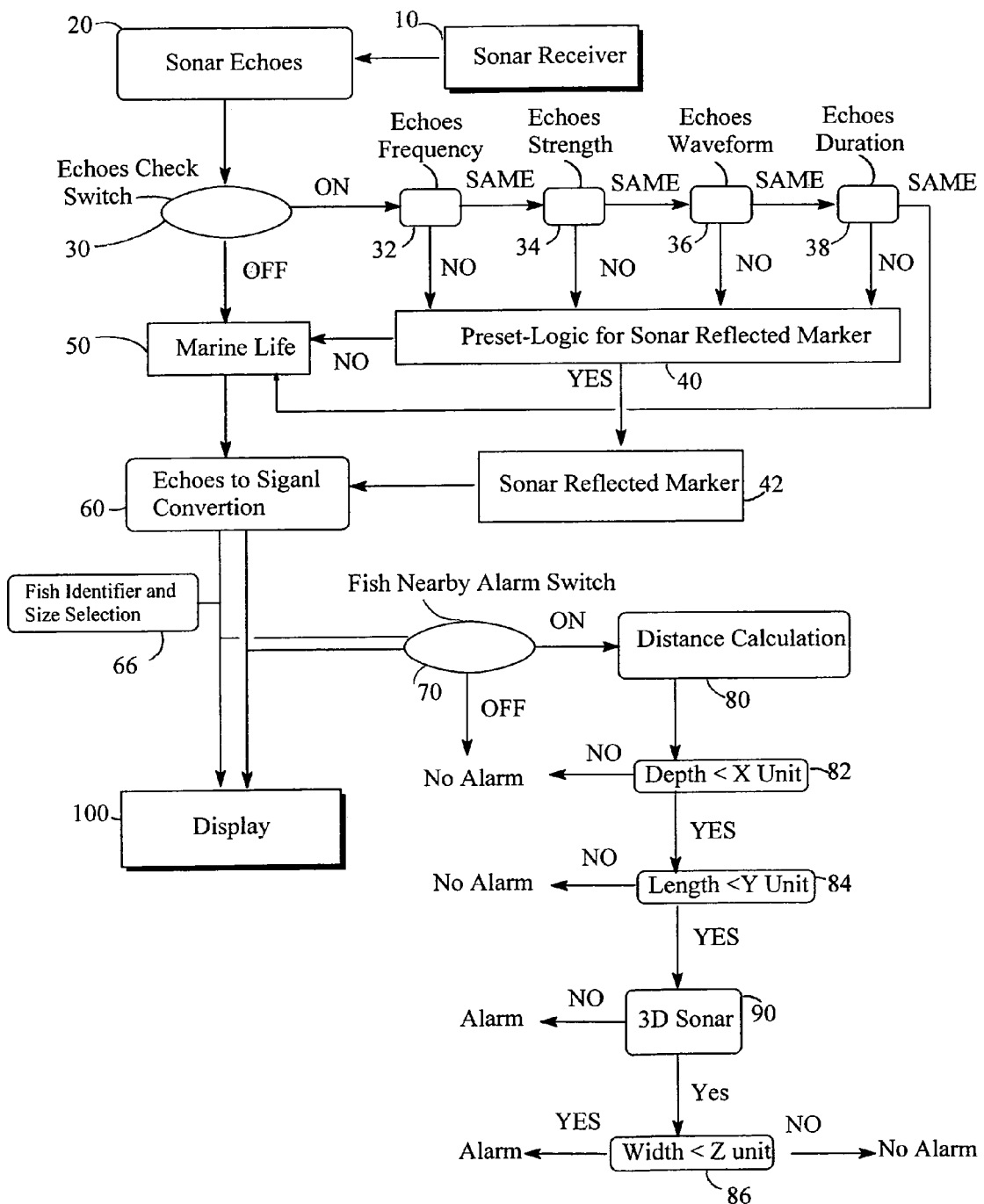
FIG. 2 is a schematic illustration of the operation process of the improved fish finder and the methods of detecting and distinguishing the sonar echoes and the methods of measuring the distance and sounding the fish nearby alarm.

FIG. 2 is a schematic illustration of the operation process of the improved fish finder and the methods of detecting and distinguishing the sonar echoes the same as shown in the FIG. 1 with an optional fish nearby alarm function. When the function of the fish nearby alarm 70 is turned on the echo signals of the sonar reflected marker and the selected sized fish are sent for distance calculation 80. The distances of the depth ΔX 82 and the length ΔY 84 of each fish to the sonar marker are calculated. When both of the differences of depth ΔX and length ΔY are smaller than a pre-selected set of values the fish finding device sounds an alarm. When a 3D sonar fish finder is used an additional distance of the width ΔZ is calculated. When all of the distances of the depth, the length and the width are smaller than a pre-selected set of values the fish finding device sounds an alarm.

Figure 3:
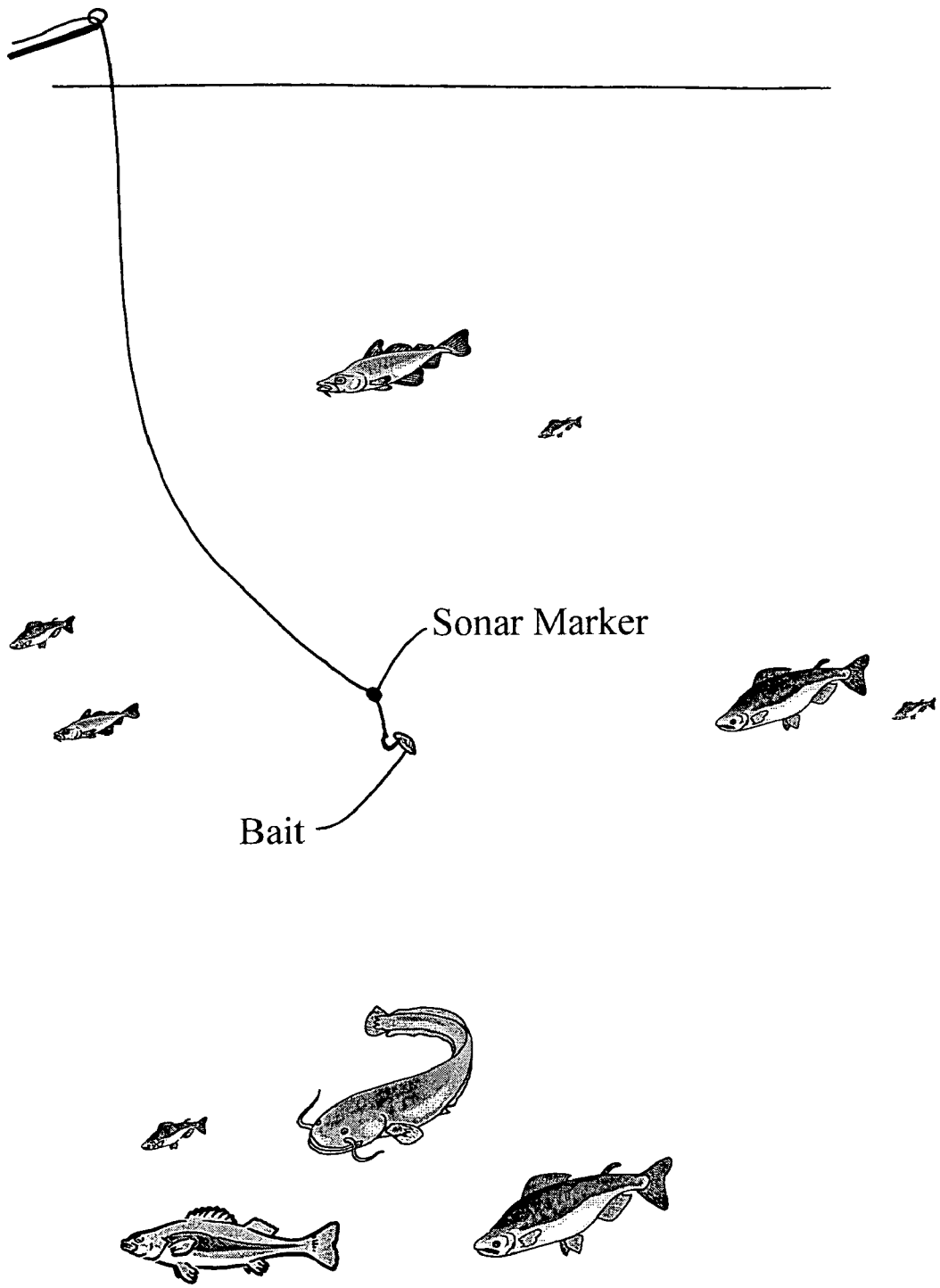
FIG. 3 shows a pictorial representation of a sonar reflected marker being attached near the bait.

FIG. 3 shows a pictorial representation of a sonar reflected marker being attached near the bait.

Figure 4:
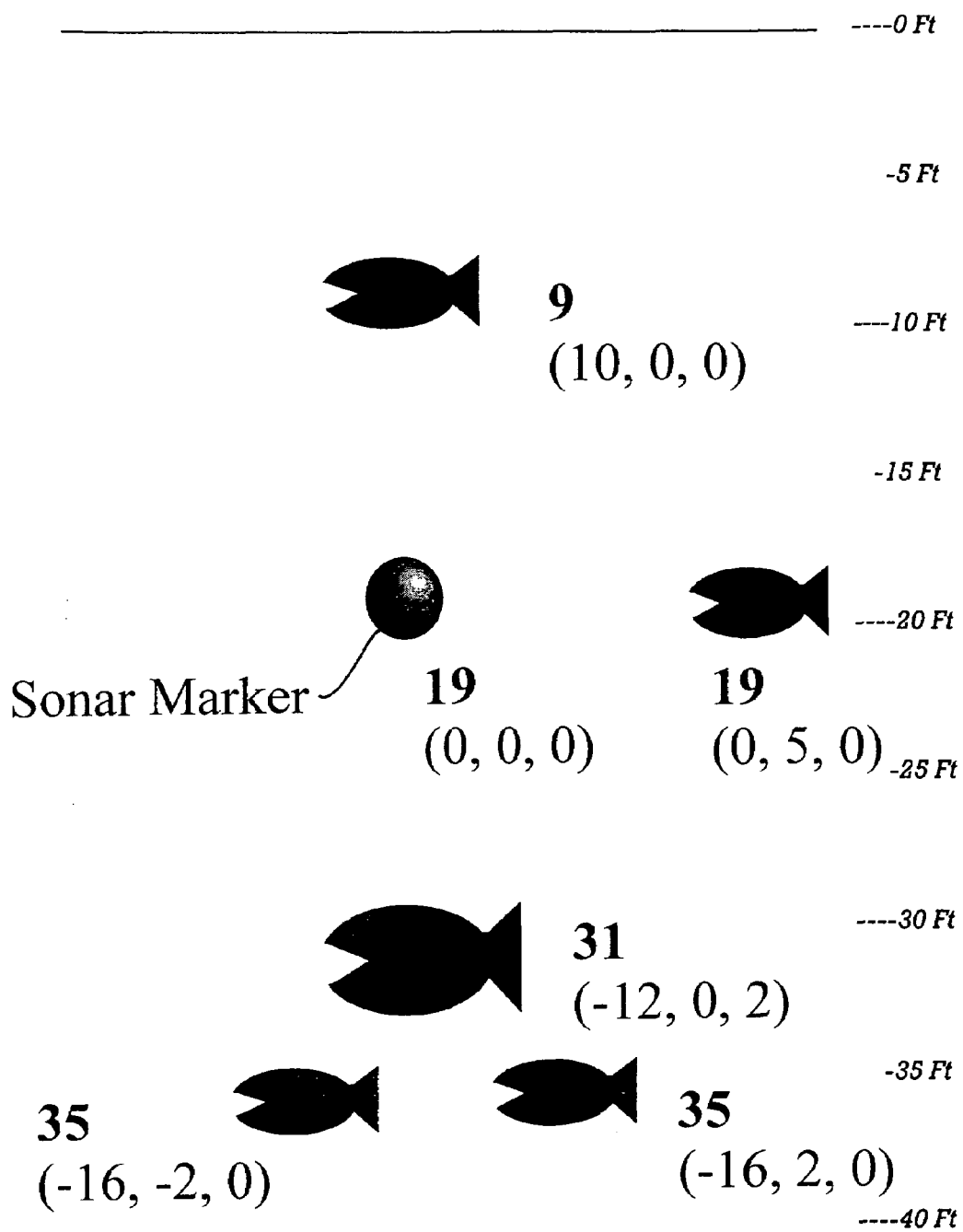
FIG. 4 shows a pictorial representation of a display of the improved fish finding device.

FIG. 4 is an example display of the improved fish finder shows the icon of the sonar reflected marker and a selected size of fish. Small fish and bait are not displayed. The sonar marker is shown as an icon of ball that is very easy to be distinguished from the fish icons. The bold numbers next to the icons are the depth of the objects that are used in most traditional fish finder. The numbers in the parenthesis are the differences of the depth, the length and the width of fish to the sonar marker respectively. The value of the sonar marker is set as (0, 0, 0). The fish at (10, 0, 0) is 10 feet above the sonar marker. The fish at (−12.0.2) is 12 feet under the sonar marker. The improved fish finding device shows only the selected sized of fish and the sonar marker (=Bait). According to the guide of the device the user should lower the bait 10+ feet deeper to reach to the location of more fish to increase the chance of fishing. After the bait is placed 10+ feet deeper the device will sound an alarm to warn the user that fish are NEARBY. The alarm can be set at different sensitivity by increasing or decreasing the pre-selected set of values for different types of fish and locations.

Figure 5:
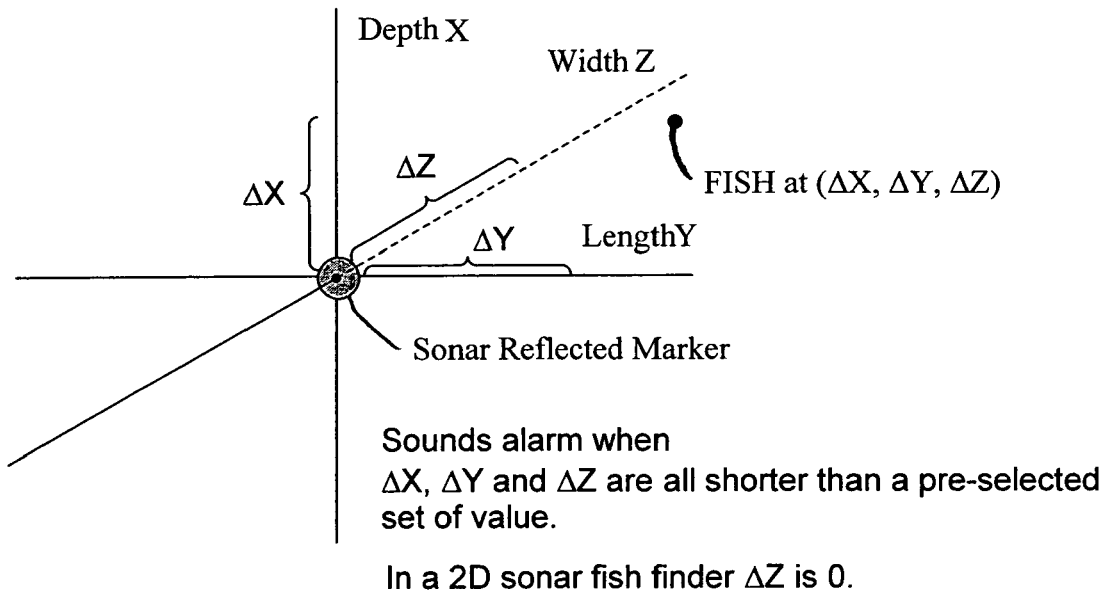
FIG. 5 shows a method of calculating the position of fish to the sonar reflected marker by the differences of the depth, the length and the width (for 3-D fish finder).

FIG. 5 shows a scheme that a fish location is calculated by the differences of the depth ΔX, the length ΔY and the width ΔZ to the sonar reflected marker that is set as (0, 0, 0). The user enters a set of values that is used to compare to the location of fish. When the values of ΔX, ΔY and ΔZ are all smaller than the pre-selected set of values the fish nearby alarm is sounded. In the conventional 2-D fish finder ΔZ is not used.

Figure 6:
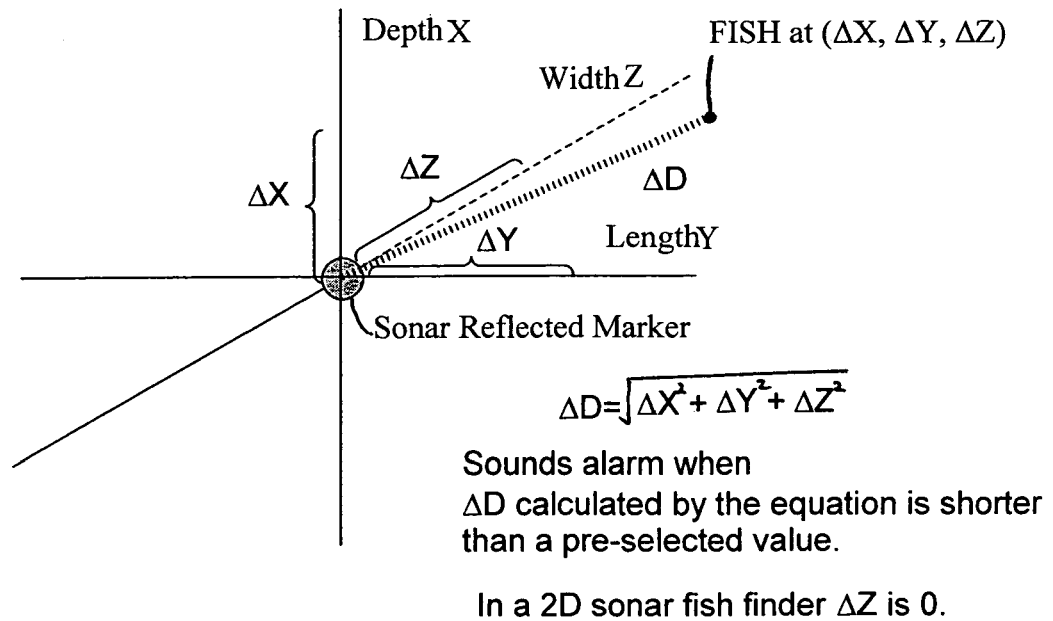
FIG. 6 shows a method of calculating the position of fish to the sonar reflected marker by an equation.

FIG. 6 shows a scheme that a fish location (ΔX, ΔY, ΔZ) is calculated by an equation to find the distance ΔD. When the distance ΔD is smaller than a pre-selected value the fish nearby alarm is sounded. In the conventional 2-D fish finder ΔZ is not used. This method is different from that shown in FIG. 5 but is equally useful.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of detecting and distinguishing marine life and a sonar reflected marker that generates artificial sonar echoes comprises steps of:
   (a) generating and transmitting a stream of sonar pulses of a pre-selected waveform;
   (b) detecting sonar echoes of said sonar reflected marker and said marine life;
   (c) distinguishing said artificial sonar echoes of said sonar reflected marker from said marine life by the difference of said sonar echoes and converting said sonar echoes into signals;
   (d) displaying echo signals of said sonar reflected marker and said marine life on a display means.

2. The method of claim 1 wherein in step (c) distinguishing said sonar reflected marker from said marine life by the strength of said echoes, the frequency of said echoes, the duration of said echoes, the waveform of said echoes or at least one of the above factors and wherein in step (d) displaying said sonar reflected marker as an icon that is different from said marine life.

3. The method of claim 2 wherein in step (c) distinguishing said sonar reflected marker from said marine life by the strength of said echoes, the frequency of said echoes, the duration of said echoes, the waveform of said echoes or at least one of the above factors and identifying fish from said marine life and converting said echoes into signals and wherein in the step (d) displaying said sonar reflected marker as an icon different from icons of said fish.

4. The method of claim 3 wherein in step (d) displaying said sonar reflected marker as an icon different from said icons of said fish and displaying said icons of said fish of a preset size; whereby only fish of a preset size and said sonar reflected marker are displayed on said fish finding device.

5. The method of claim 4 and further including an additional step (e) calculating the distance of said sonar reflected marker and said fish by a microprocessor and sounding an alarm when said distance is shorter than a pre-selected value; whereby user gets a better underwater information of fish near said sonar reflected marker that is placed near a bait.

6. The method of claim 5 wherein in the step (e) said distance $\Delta D$ is equal to square root of the sum of the square of $\Delta X$ and the square of $\Delta Y$, and $\Delta X$ is difference of the depth to said sonar marker and $\Delta Y$ is difference of the length to said sonar marker; whereby said distance $\Delta D$ of said fish to said sonar reflected marker can be individually calculated by said microprocessor.

7. The method of claim 5 wherein in the step (e) said distance includes difference of the depth $\Delta X$ to said sonar marker and difference of the length $\Delta Y$ to said sonar marker and sounding an alarm when $\Delta X$ and $\Delta Y$ are both shorter than a preselected set of value; whereby said method is useful in most 2D (2 dimensional) sonar fish finders.

8. The method of claim 7 wherein in the step (e) said distance includes an additional difference of the width $\Delta Z$ to said sonar marker and sounding an alarm when $\Delta X$, $\Delta Y$ and $\Delta Z$ are all shorter than a preselected set of value; whereby said method is useful in advance 3D (3 dimensional) sonar fish finders.

9. A fish finding device comprising a sonar transmitter, a sonar receiver, a microprocessor to control said transmitter and said receiver and to convert sonar echoes into signals and said microprocessor is capable of distinguishing sonar echoes of marine life from a sonar reflected marker, that generates artificial sonar echoes, by the difference of said echoes and converting said echoes into different signals, and a display means to display said signals from said microprocessor and said display means capable of displaying said sonar reflected marker as an icon that is different from marine life.

10. The fish finding device of claim 9 wherein said microprocessor capable of distinguishing echoes from said marine life and said sonar reflected marker by the strength of said echoes, the frequency of said echoes, the waveform of said echoes and the duration of said echoes or at least one of the above factors.

11. The fish finding device of claim 9 wherein said display means capable of displaying at least one of said sonar reflected marker as different icons that are different from said marine life; whereby said fish finding device provides user a clear relative position of more than one of said sonar reflected markers and said marine life.

12. The fish finding device of claim 10 wherein said microprocessor is capable of distinguishing fish from said marine life and said display means is capable of displaying said sonar reflected marker as an icon that is different from said fish and wherein said microprocessor is capable of calculating the distance of said sonar reflected marker and said fish and generating an alarm when said distance is shorter than a pre-selected value; whereby said fish finding device provides user the information of said marine life and alarms said user when said fish are closed to said sonar reflected marker that is located near a bait.

13. The fish finding device of claim 12 wherein said microprocessor is capable of distinguishing size of said fish and said microprocessor is capable of calculating the distance of said sonar reflected marker and said fish of a preset size and generating an alarm when said distance is shorter than a pre-selected values; whereby said fish finding device sounds an alarm only when fish of a preset size is near said sonar reflected marker.

14. The fish finding device of claim 12 wherein said microprocessor capable of distinguishing echoes of more than one of said sonar reflected markers from said fish and wherein said display means capable of displaying said sonar reflected markers as different icons and one of said icons can be selected for said microprocessor to calculate the distance of said fish to said sonar marker and to sound an alarm when said distance is shorter than a pre-selected values; whereby two or more sonar reflected markers could be used at one time in the same location.

* * * * *